F. A. LAW.
SPEED CHANGING MECHANISM.
APPLICATION FILED FEB. 5, 1902. RENEWED JULY 8, 1907.
1,010,273.
Patented Nov. 28, 1911.
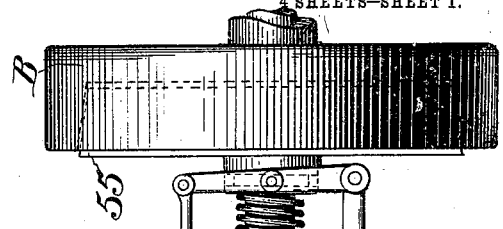

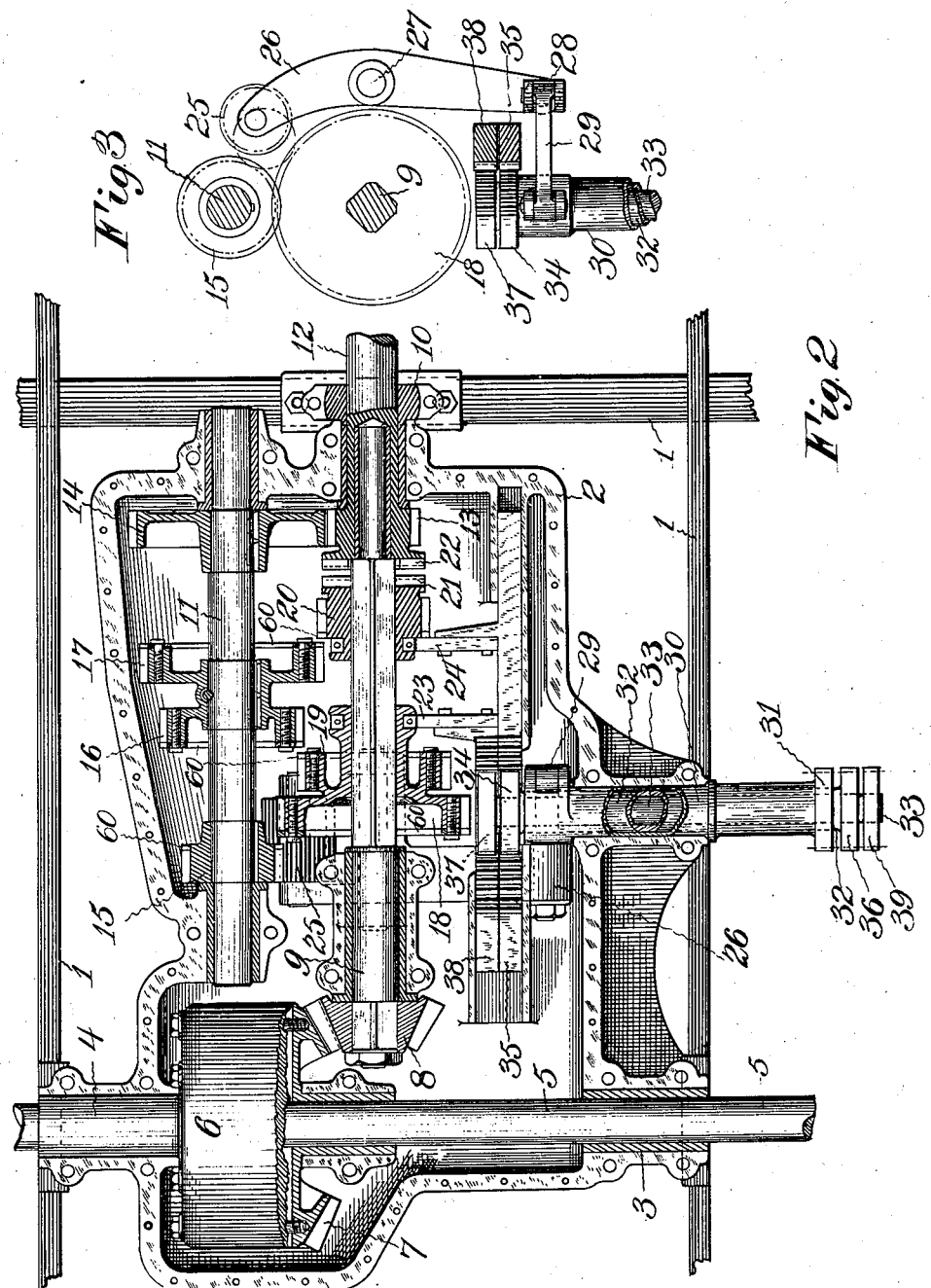

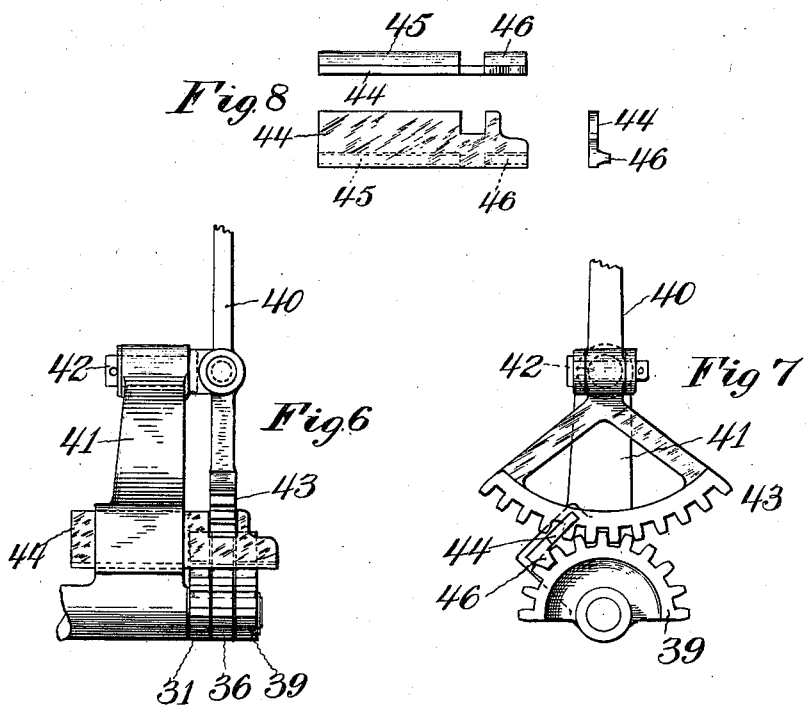

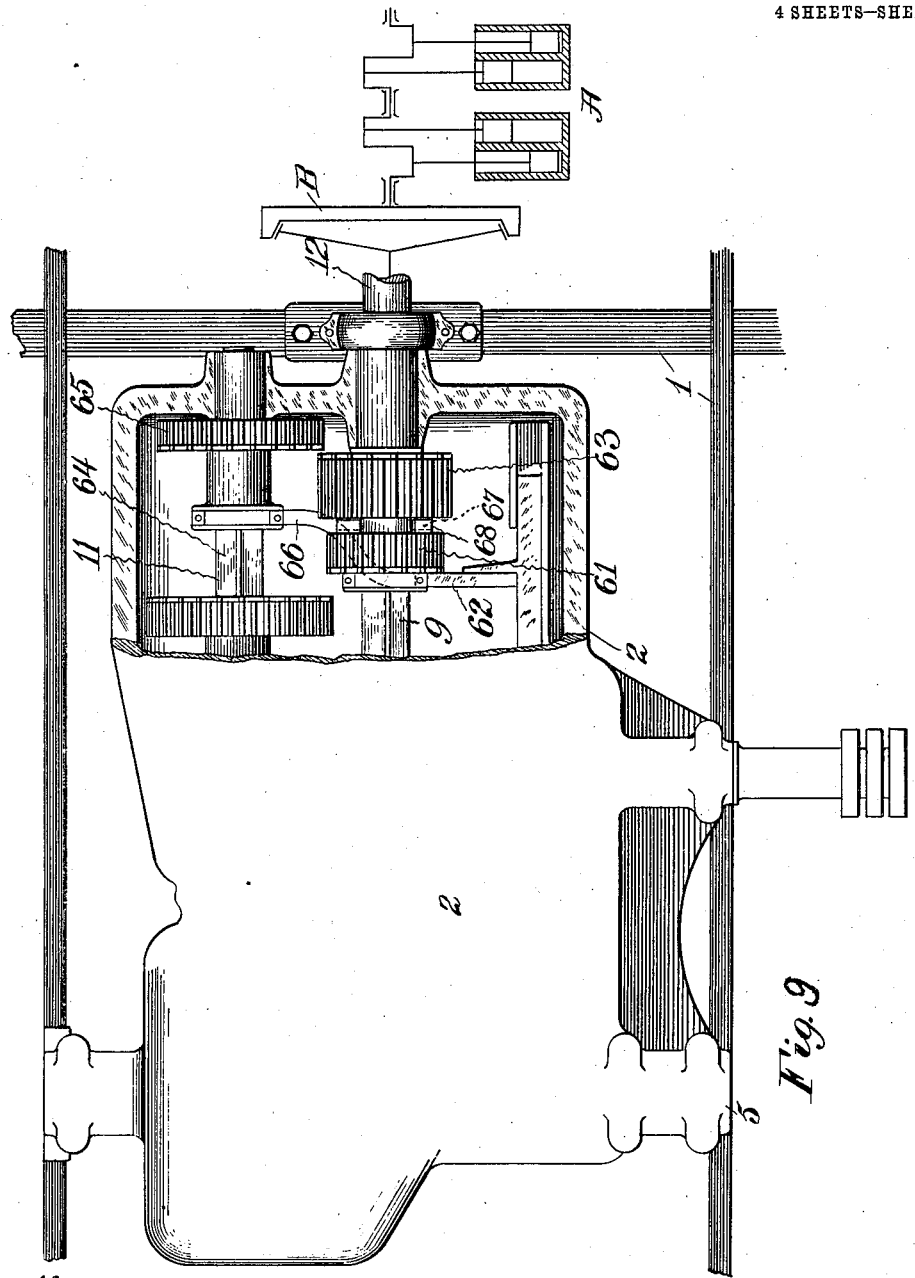

UNITED STATES PATENT OFFICE.

FRED A. LAW, OF HARTFORD, CONNECTICUT, ASSIGNOR, BY MESNE ASSIGNMENTS, TO THE COLUMBIA MOTOR CAR COMPANY, OF HARTFORD, CONNECTICUT, A CORPORATION OF CONNECTICUT.

SPEED-CHANGING MECHANISM.

1,010,273.   Specification of Letters Patent.   Patented Nov. 28, 1911.

Application filed February 5, 1902, Serial No. 92,677. Renewed July 8, 1907. Serial No. 382,721.

*To all whom it may concern:*

Be it known that I, FRED A. LAW, a citizen of the United States, and resident of Hartford, county of Hartford, and State of Connecticut, whose post-office address is Hartford, Connecticut, have invented certain new and useful Improvements in Speed-Changing Mechanism, of which the following, taken in connection with the accompanying drawings, is a specification.

The invention relates to a mechanism for changing the relative speed between two shafts, and more particularly to a mechanism of this class in which a plurality of speeds may be secured upon a driven shaft from a driving shaft by the interposition of gearing, the position of which may be so varied as to give an independent speed for each particular position of the gears.

As shown in the accompanying drawings, the mechanism is designed particularly for use upon a self-propelled vehicle, the parts being so arranged and so inclosed in a casing that the entire mechanism is self-contained and is supported in an approved manner to give the desired flexibility, at the same time maintaining a certain and proper mesh between the several gears; but it is of course understood that the particular form shown and described is only one of many methods which may be used in carrying out my invention.

The objects of the invention are to provide a mechanism of the class specified in which the several gears or sets of gears may be moved to their several positions to secure the desired variations of speed between the driving and driven shafts; to provide a means for shifting said gears to secure the various speeds by the use of a single controlling lever; to provide a means for reversing the direction of movement of the driven shaft; to provide an interlock for the controlling lever which shall insure the throwing in of the gears to give any single speed; to provide means for locking the controlling handle against a movement to throw in the reversing gear, except under predetermined conditions, and, to provide an interlock intermediate of the speed changing lever and a clutch to insure the disengagement of the clutch at the moment of engagement of any of the sets of gears; to provide an interlock for all the parts of the mechanism except those which are in use, and to provide a means whereby in one position of the parts, power may be transmitted directly from the source of power to the driven shaft.

Referring to the drawings;—Figure 1 is a view in side elevation of an inclosing casing and controlling mechanism. Fig. 2 is a horizontal section through the gear changing mechanism, the upper half of the casing being removed. Fig. 3 is a detail view of the reversing mechanism and appurtenant parts. Fig. 4 is a detail view of the change lever interlocking parts. Fig. 5 is a detail view of a modified form of clutch and change gear interlock. Fig. 6 is a detail view in side elevation of the controlling mechanism appurtenant to the controlling handle, showing the interlock. Fig. 7 is a view of the parts shown in Fig. 6 looking from the right of said figure. Fig. 8 is a detail view in plan, elevation and end view of the locking bolt shown in Fig. 6. Fig. 9 is a plan view of the mechanism similar to that shown in Fig. 2 showing a slightly modified form for securing a direct drive between the source of power and driven shaft.

The device hereinafter described, belongs to the general class of change speed gears known in the vehicle art as a sliding gear change speed mechanism, and in all devices so far as known, the main driving shaft of the change speed mechanism has been coupled by means of the fly-wheel B to a motor or plurality of motors A, diagrammatically shown in Fig. 9 and has carried a series of gears and pinions arranged to mesh with gears or pinions upon a countershaft or gear carriage which counter-shaft has been arranged, to drive through suitable gearing, a transverse driven shaft or a rear axle.

In the device herein shown and described, the sliding gears for effecting the several changes of speed, are borne upon the main shaft of the change speed mechanism which is practically a continuation of the motor shaft, and is provided with means for connecting it directly with the motor shaft, and forms the gear carriage, while the countershaft has mounted upon it, a set of gears adapted to mesh with the sliding gears of the main shaft. The parts are so arranged, that when no reduction of movement is required of the change speed mechanism, a direct drive will be effected from the motor shaft, through the main shaft of the change speed mechanism to the transverse shaft, and when the parts are in this position it is possible to secure a direct drive without the rotation of the intermediate gears carried upon the counter-shaft.

Referring to the drawings, the numeral 1 denotes a frame work of the vehicle upon which is supported a casing 2. This casing is provided at or near one end with bearings 3, 4, for the transverse or driven shaft 5, which in the present instance is a divided shaft, bearing a balance gear 6 of ordinary construction provided with a bevel gear 7, adapted to be driven by a bevel pinion 8 secured to the main driving shaft 9 of the speed changing mechanism.

The casing 2 is a sectional casing so arranged that parts may be removed to give easy access to the interior without disturbing any of the bearings or parts of the mechanism, and this casing has two points of support at one end and is supported at the opposite end at a single point concentric with the main driving shaft and in a ball or socket bearing 10 which gives the desired amount of flexibility to the parts without causing undue strains.

Parallel with the main shaft 9, and arranged in suitable bearings in the casing, is a counter shaft 11 which has keyed to it a series of gears and pinions adapted to mesh with the sliding gears and pinions upon the main shaft. The shaft 9 is axially alined with the motor shaft 12, and in fact telescopes with the engine shaft 12 and has a bearing in it. The shaft 12 bears at its end which projects within the casing, a pinion 13, which meshes with a gear 14, upon the counter-shaft 11, and drives the latter, at a speed relatively less than that of the engine shaft. Secured to the shaft 11 are three other gears, 15, 16, and 17, the two latter gears being formed integral. Upon the shaft 9 are arranged gears, 18, 19, 20, the two former formed integral and adapted to be thrown into mesh either with the gear 15 or the gear 16 of the counter-shaft, while the gear 20 is arranged to be slid into mesh with the gear 17. This gear or pinion 20 might really be termed a clutch pinion inasmuch as it bears upon one side, a clutch surface 21 adapted to coöperate with a clutch surface 22 upon the engine shaft 12. The gears, 18, 19 and 20 are arranged to move axially of the shaft 9, which is of substantially square cross sectional area to prevent relative movement of the shaft and gears. The gears 18, 19 have an annular grooved hub embraced by a yoke 23, and the hub of the clutch pinion 20 is also embraced by a similar yoke 24.

When the parts are in position shown in Fig. 2 of the drawings, it is apparent that all of the gears are out of mesh and even though the engine shaft 12 be running, no motion will be transmitted to the transverse or driven shaft 5 though the counter-shaft 11 with its supported gears will be rotated through the intermeshing gear 14 and pinion 13. If the yoke 23 is shifted toward the left (as regards Fig. 2) the gear 18 will be thrown into mesh with the gear 15, and obviously, the main shaft 9 will be driven at a speed relatively lower than that of the engine shaft. If the yoke 23 be moved to the right, the gear 19 will be thrown into mesh with gear 16, the gears 15, 18 being at the same time disengaged. This position of the parts will give a slightly increased speed to the shaft 9. Now, if the gears 15, 16, 18 and 19 are disengaged, and the yoke 24 is thrown to the left, the clutch pinion 20 will be engaged with the gear 17 and the shaft 9 will be driven at a still greater rate of speed.

When it is desired to drive the shaft 9 directly from the engine shaft and at the same speed, the clutch pinion 20 is shifted to the right and the clutch parts 21, 22 are brought into engagement. Thus, it will be seen, that by shifting the several gears along the shaft 9 it is possible to secure four different speeds of the shaft 9, which speeds will be transmitted to the transverse shaft 5 through the bevel gear and pinion 7 and 8.

To secure a reverse direction of movement of the shaft 9, a pinion 25 mounted upon a swinging lever 26 is arranged to be thrown into position to mesh with and form an intermediate gear between the gears 15, 18. This lever 26 is pivoted as at 27 and is connected at its end through a universal joint 28, with a short link 29 which is pivotally attached to the enlarged end of a sleeve 30 bearing at its outer end and without the casing, a gear segment 31. Arranged concentrically with relation to this sleeve 30 are sleeve 32 and shaft 33, the former bearing at its inner end a gear segment 34 which meshes with a sliding rack bar 35, to which is secured the yoke 24. At its outer end the sleeve 32 bears a segment 36. The shaft 33 bears at its inner end a gear segment 37, meshing with a sliding rack bar 38 to which is secured the yoke 23, and at its outer end a gear segment 39. All the several concentric parts are mounted in a suitable bearing formed in the casing 2 and the position of the several gears is dependent upon their rotation. Obviously, when the gear segment 39 is rotated in one direction, the yoke 23 will be moved to the left and cause engagement of the slow speed gears 18 and 15. When moved to the right the gears 19 and 16 will be thrown into engagement upon the disengagement of the gears, 15, 18. When the segment 36 is moved in one direction, the yoke 24 will be moved toward the left causing engagement of the clutch pinion 20 and gear 17, and when moved to the right, the shaft 9 will be directly connected with the engine shaft 12. When the segment 31 is rotated in one direction, the lever 26 will be rocked by the movement of link 29 and sleeve 30 to throw the intermediate pinion 25 into mesh with the gear 18 and pinion 15, thus changing the direction of movement of the shaft 9 as regards shaft 11. Obviously, when the segment 31 is moved in the opposite direction, the pinion 25 will be thrown out of engagement.

In Figs. 1, 2, 4, 6, 7, and 8, there is shown a controlling mechanism for determining the movement of the segments 31, 36 and 39 and the consequent position of the several parts of the change gear mechanism. In these figures, the numeral 40 denotes a controlling handle which is suitably pivoted upon a frame 41 through a swiveling pivot 42, which permits a movement of the controlling handle in two transverse planes. This controlling handle bears at its lower end a gear segment 43 adapted to mesh with either one or the other of the gear segments 31, 36 and 39. This gear segment is embraced by a lock bolt 44 arranged to slide in a suitable guide-way formed in the support 41 and provided with locking teeth 45, 46, adapted to be slid between the teeth of the gear segments 31–36 and 39 as the controlling handle 40 is shifted to cause engagement of the segment 43 and segments 31, 36 and 39. It will be noted, that while the locking teeth 45 and 46, are arranged in the same line, a space is left between them sufficient to permit movement of whichever of the segments 31, 36 and 39 are engaged by the segment 43.

From the above it will be seen that all parts of the mechanism are locked against movement except the particular one which is selected to be moved to give any of the required speeds either forward or reverse. The upper end of the controlling handle 40 is embraced by a slotted guide plate 47, provided with a series of parallel guides connected by a transverse opening of sufficient width to permit the passage of the controlling handle when moved in one direction of its movement.

When the controlling handle 40 is in the position shown in Fig. 4, all of the gears are thrown out of mesh as shown in Fig. 2. If the handle 40 is moved upon the pivot 42 and thrown in to the channel 48 and thrown to the left as regards Fig. 4, the gear 18 and pinion 15 will be thrown into mesh giving a slow speed of the shaft 9. If thrown to the right, the gears 18, 19 will be thrown into mesh giving an increased speed. If thrown into the channel 49 and moved to the left, the clutch pinion 20 and gear 17 will be engaged, and if thrown to the right in this channel, the main shaft 9 and motor shaft 12 will be directly connected. Spring stops 50 are provided in each of these channels for holding the lever when it has been once thrown to the limit of its travel. When it is desired to change the direction of movement of the shaft 9 by throwing in the intermediate pinion 25, the controlling handle 40 is shifted into the channel 51 and moved to the left. A latch 52 is provided which prevents the movement of the lever 40 into the guide 51 until the latch has been moved. This insures proper use of the reversing gear.

To insure the proper use of the change speed mechanism with relation to the speed of the motor shaft, an interlock is provided between the controlling handle and a clutch arranged upon said shaft. This may be accomplished in various ways, a convenient and simple method being illustrated in Fig. 1. This interlock comprises a cam 53 coöperating with a lever 54, which controls the position of a clutch 55 through a suitable connection 56. This clutch may also be operated through an independent lever 57, but it is apparent from the arrangement of the parts that whenever the controlling lever 40 is shifted to its normal position throwing out all of the several gears, the clutch 55 will be disengaged. Thus, whenever a change is made from one speed to another, the clutch will be thrown out at the instant of engagement of any of the sets of gears. This is rather essential when the device is used upon a self propelled vehicle to insure easy engagement of the gears and prevent fracture of the parts.

In Fig. 5 there is shown a modified form of interlock which necessitates the throwing of the clutch by the independent lever 59 before the controlling lever 40 can be moved from its normal position. In devices of this sort the gear teeth are very often chipped and broken or worn away to a great extent by the slipping action as they come into engagement, and where a full number of teeth is provided, extending across the entire face of the gear, it is more difficult to cause engagement of the sliding gears when they are running at comparatively high speeds. By providing a shroud, or cutting away the ends of the alternate teeth, a greater space is provided which insures quick engagement of the gears as they are slid into mesh, and obviously, when one of the teeth is engaged, the gears may be easily slid into full driving position. Of course, a shroud may be provided at either or both sides of a gear dependent upon its use, it only being essential that shrouds be used on the opposing sides of the two mating gears. The number of teeth in the shroud is entirely immaterial, and in lieu of a shroud, the ends of the alternate teeth on a gear may be cut away though it is preferred to use a shroud for the purposes of hardening and renewal.

In Fig. 9 of the drawings there is shown a slightly modified form of gear mechanism. In this form of the device, the frame 1, casing 2, shafts 9, 11, 12 and 5, have the same relative position and carry the same number of gears. In fact, the only change in arrangement is in the clutch pinion 61 and operating yoke 62, the gears intermeshing with such parts and the main driving pinion, 63. The shaft 11 in this case is squared for a portion of its length as at 64, and upon this squared portion is mounted a gear 65, which, through a yoke member 66 secured to and moving with the yoke member 62, may be moved axially of the shaft 11. The motor shaft 12 is provided with a driving pinion 63, provided with one member of a clutch 67, adapted to be engaged by a second clutch member 68, moving with the clutch pinion 61. Obviously, from this arrangement of the parts, when it is desired to drive the main shaft 9 at the same speed as the motor shaft 12, the yoke 62 will be shifted to the right to cause engagement of the clutch members 67, 68, and, at the same time, the gear 65 will be moved out of engagement with the pinion, 63. Thus, all of the parts of the mechanism except those upon the main driving shaft 9, will remain idle and at rest. The advantages of such an arrangement are apparent, and in fact, this form of mechanism for securing a direct drive between the motor shaft and shaft 9, is preferred to that shown in Fig. 2 as wear and friction are reduced and the number of rotating parts is reduced to a minimum.

It will be obvious that my invention can be embodied in various forms and constructions other than those shown and described herein, wherefore the invention is not to be restricted to the particular form and construction shown and described, but may be subject to various modifications in detail and arrangement within the terms of my claims as hereinafter set forth.

What I do claim as my invention and desire to secure by Letters Patent is.

1. In combination in a change speed mechanism, a driving shaft, a driven shaft, mechanism for clutching said driving shaft to said driven shaft, transmitting means for imparting a plurality of different speeds from said driving shaft to said driven shaft including gears sliding upon the driven shaft, and means for shifting said gears means whereby the speed of the driven shaft may be changed directly to any speed relative to the driving shaft, without passing through intermediate speed positions.

2. In combination in a change speed mechanism, a driving shaft, a driven shaft, mechanism for clutching said driving shaft to said driven shaft, said driving shaft and said driven shaft being in axial alinement, axially shiftable gears for transmitting a plurality of different speeds from said driving shaft to said driven shaft, and means for shifting said gears axially, whereby the speed of the driven shaft may be changed directly to any speed relative to the driving shaft, without passing through intermediate speed positions.

3. The combination in a change speed mechanism, a driving shaft and a driven shaft arranged in the same axial line and adapted for independent movement, change gears carried upon said driven and said driving shafts for giving two forward drives, transmitting means coöperating with said gears, means for moving said gears axially, relative to each other, for bringing the same into operation, and a clutch mechanism for directly connecting said driving and driven shafts.

4. In combination in a change speed mechanism, a driving shaft, a gear borne upon said shaft, a countershaft, a gear borne upon the countershaft and meshing with the gear upon the driving shaft, a driven shaft operatively arranged with relation to the driving shaft and provided with a clutch mechanism adapted to clutch it directly to said shaft, and intermediate gears borne upon the driven shaft and countershaft, means for moving certain of said gears whereby the speed of the driven shaft may be changed directly to any speed relation to the driving shaft without passing through intermediate speed positions.

5. In combination in a change speed mechanism, a driving shaft, driven shaft and countershaft, a casing inclosing said shafts and forming a support therefor, gearing intermediate of the driving shaft and countershaft adapted to drive said countershaft at a constant speed relatively to the driving shaft, change speed gears mounted upon and rotating with said countershaft, sliding gears arranged upon the driven shaft, means for shifting their position to engage one or the other of the gears upon the countershaft in any desired selective order, and means intermediate of the driving and driven shafts for forming a direct connection between them when the sliding gears are out of mesh with their mating gears.

6. In combination in a change speed mechanism, a driving shaft, driven shaft and a countershaft, gears secured to said countershaft, a gear on the driving shaft, gears mounted upon the driven shaft and adapted to have an axial movement thereon, means for moving said gears axially on said shaft, whereby they may be thrown into position to engage in any desired sequence one or the other of the gears upon the countershaft, and means for directly connecting the driving shaft and driven shaft, whereby they will be driven at the same speed when the sliding gears are out of mesh with their mating gears.

7. In combination in a change speed mechanism, a driving shaft, a driven shaft, a supporting casing, countershaft and transverse shaft operatively arranged with relation to each other and borne in said supporting casing, intermeshing gears arranged upon said shafts and adapted by their position to determine the relative rotation of the transverse shaft and the driving shaft, bearings for supporting said casing upon the transverse shaft, means for supporting the casing and transverse shaft at two points adjacent to said shaft, and a universal bearing for supporting the opposite end of the casing.

8. In combination in a change speed mechanism, a driving shaft, a driven shaft, a gear upon said driving shaft, gears slidably mounted upon said driven shaft, a countershaft, gears borne upon said countershaft and adapted to be engaged by the sliding gears of the driven shaft, movable yokes for sliding said gears, concentric shafts and sleeves for moving said yokes, and means for imparting rotation to said concentric members.

9. In combination in a change speed mechanism, a driving shaft, a driven shaft, and a countershaft, gears secured to said countershaft, axially movable gears arranged upon the driven shaft and adapted to engage the gears of the countershaft, a driving pinion upon the driving shaft, a sliding gear mounted upon the countershaft, means for positively moving said gear into and out of engagement with the gear of the driving shaft, and a clutch adapted to positively unite the driving and driven shafts, when the sliding gear of the countershaft is thrown out of mesh with its mating pinion.

10. The combination in a change speed mechanism, with driving and driven shafts, and gears for varying the relative speeds thereof, of means for varying the position of the gears, said means including an operating handle mounted upon a swiveling pivot, a gear segment borne upon said handle, a plurality of segmental gears coöperating with said gear segment, and a locking bolt adapted to be moved by said segment and provided with a tooth adapted to engage and prevent movement of all but one of the segments.

11. The combination in a change speed mechanism, with driving and driven shafts, and gears for varying the relative rotation of said shafts, of means for controlling the position of said gears including segmental gears and movable rack bars actuated through said segmental gears, an operating handle adapted by its position to move one or the other of said segmental gears, said handle being mounted upon a swiveling pivot, whereby a movement is permitted in two planes transverse to each other.

12. In combination in a change speed mechanism, a driving shaft and driven shaft, a driving gear for the former, a plurality of intermediate gears including a reversing gear, and means for driving said driven shaft from anyone of said intermediate gears in any sequence.

13. In combination in a change speed mechanism, a driving shaft, a driven shaft, a plurality of transmission gears mounted to slide thereon, a countershaft, a plurality of intermediate gears fixed to said countershaft, and means for sliding said transmission gears, said transmission gears and said intermediate gears being constructed and arranged relative to each other so that said intermediate gears may engage in any order of selection and drive respectively but singly the said transmission gears, and means to couple said driven shaft directly to said driving shaft.

14. Transmission mechanism for motor vehicles, the same comprising a driving member, a driven shaft, a plurality of transmission gears mounted to slide thereon and a plurality of intermediate gears arranged at one side of said shaft, said transmission gears and said intermediate gears being constructed and arranged relative to each other, so that said intermediate gears may be caused to engage respectively in any order of selection but singly the said transmission gears and to drive the same, said intermediate gears being driven by said driving member, and means to couple said driven shaft directly to said driving member.

15. Transmission mechanism for motor vehicles, the same comprising a driving member, a driven shaft, a plurality of transmission gears mounted to slide thereon, and a plurality of intermediate gears arranged at one side of said shaft to engage respectively but singly the said transmission gears, means for selecting any of said transmission gears for engagement, said intermediate gears being driven by said driving member, and means to couple said driven shaft directly to said driving member through a part embodying a transmission gear.

16. Transmission mechanism for motor vehicles, the same comprising a driving gear, a driving clutch and its movable member connected with and to rotate said driving gear, a driven shaft alined axially with said driving gear, a plurality of transmission gears mounted to slide on said driven shaft, a countershaft parallel with said driven shaft, and gears fixed thereon driven by said driving gear and for engagement respectively with the said transmission gears, and a reversing gear also driven from said countershaft and for engagement with a transmission gear.

17. The combination of the motor, the fixed and movable clutch members therefor, the driving gear connected with one of said clutch members to rotate therewith and to permit relative axial movement thereof, a driven shaft axially alined with said driving gear, a transverse shaft, and a casing supporting the same in common with said driving gear and driven shaft, means to couple the said gear and driven shaft to cause the two to rotate in unison and directly drive said driven shaft, and means also to drive said driven shaft from said driving gear at a different speed.

18. In a motor vehicle, the motor, clutch, driving gear and driven shaft all axially alined, means to drive said driven shaft from said driving gear at the same and also at different speeds, a jack-shaft arranged at an angle with said driven shaft and connected directly thereto, and vehicle driving wheels connected with and driven from said jack-shaft.

19. In a motor vehicle, a motor, its clutch and operating means therefor, transmission mechanism to transmit the motive power at the motor speed or at one or more speeds at variance therewith, operating means therefor movable independently of said clutch-operating means, and means connecting said clutch-operating means and transmission-operating means for enforcing release of the clutch before change of transmission.

20. In a motor vehicle, a motor, its clutch and operating means therefor, transmission mechanism to transmit the motive power at the motor speed or at one or more speeds at variance therewith, operating means therefor movable independently of said clutch-operating means, and means for enforcing predetermined position of the transmission-operating means before throwing in of the clutch.

21. Transmission mechanism for motor vehicles, the same comprising a driving member, an independently rotatable driven shaft, a plurality of transmission gears mounted to slide thereon independently of each other, and a plurality of intermediate gears arranged at one side of said shaft to engage respectively but singly the said transmission gears, said intermediate gears being driven by said driving member, and means to couple said driven shaft directly to said driving member.

22. The combination with the motor and its balance wheel constituting one clutch member, a coöperating movable clutch member, and spring-actuated means to press the latter normally into frictional engagement with said wheel, a driving gear connected to rotate with said movable clutch member, upon and relative to which said movable clutch member has axial movement, a driven shaft driven by said driving gear, and means to vary the driven shaft speed including longitudinal sliding gears interdependent upon the spring actuating means of said clutch member.

23. In a motor vehicle, a motor, a transmitting mechanism provided with a slidable transmission member having three or more operative positions for providing varying speeds, operating means therefor, a clutch interposed between said motor and said transmission mechanism, clutch-operating means therefor, and means connecting said clutch-operating means and said transmission-operating means for enforcing release of the clutch when said slidable member passes from one position to another.

24. In combination in a change speed mechanism, a driving shaft, a driven shaft, a countershaft in fixed relation to said driving and driven shafts, and operative gearing on said shafts, an inclosing casing, a bearing in said casing for one end of the driven shaft, the other bearing for said driven shaft being within the driving shaft bearing.

25. In combination in a change speed mechanism, a driving shaft and a driven shaft operatively arranged, an inclosing casing, a bearing in said casing for one end of one of said shafts, the other end of said shaft having a bearing within the other shaft bearing, a countershaft in fixed relation to said driving and driven shafts, and a plurality of gears connecting said counter shaft and driving and driven shafts.

26. In combination in a change speed mechanism, a driving shaft and a driven shaft axially alined, a countershaft in fixed relation to said driving and driven shafts, a plurality of gears connecting said counter driving and driven shafts, an inclosing casing, a bearing in said casing for one end of the driven shaft, the other end having a bearing within the driving shaft bearing.

27. In a change speed mechanism, a shaft having a bearing concentric with and in the plane of a second shaft bearing, a second shaft, gears mounted to slide upon the first shaft, a gear on the second shaft, intermediate gearing, and a clutch mechanism adapted to directly connect the two shafts.

28. In a transmission gearing, a shaft or shaft section, a gear thereon continuously driven thereby and forming one member of a clutch, a second shaft axially alined with said gear, and a gear mounted to slide on said second shaft forming the other clutch member to directly connect said first named gear with said second shaft, one or more independent gears sliding on said second shaft, a countershaft in fixed relation with said first named shafts and having gears thereon, and means whereby said gears are inoperative when said first named gear is directly connected with said second shaft.

29. In a transmission mechanism for motor vehicles, a casing, a driving shaft or shaft section projecting into said casing at one side, a bearing therefor in the wall of said casing, a gear and clutch part integral with said shaft section and entirely on one side of said bearing within said casing, a driven shaft in said casing having a movable complementary clutch part, a countershaft in fixed relation to said driving and driven shafts, and a plurality of gears on said shafts, whereby varying speeds are transmitted to said driven shaft, a shaft projecting from said casing and connected to said driven shaft.

30. In combination in a transmission mechanism, a casing, a driven shaft, a driving shaft section projecting into said casing and embodying with its inner end integrally pinion teeth and clutch elements, said shaft section having an external and an internal bearing coöperating respectively with said casing and said driven shaft, gears upon said shafts operatively arranged, and a coöperating clutch element on said driven shaft.

31. In a power transmission mechanism for motor vehicles, a casing, arms on said casing for supporting the same on the vehicle frame, a shaft or shaft section, a gear, a bearing in one wall of said casing supporting said shaft or shaft section and said gear, a second shaft having one bearing in said first named shaft and another bearing at its opposite end in said casing, and a countershaft in operative fixed relation to said first named shafts, and a plurality of gears on said shafts operatively arranged.

32. In a power transmission mechanism for motor vehicles, a parted casing, a driving shaft, a friction clutch for gradually applying the power to said driving shaft, said driving shaft projecting into one end of said casing and supported in a bearing in the wall thereof, a driven shaft or member projecting from the casing at or near the opposite end, the parting in said casing being in the plane of the axes of said driving and driven shafts, the lower section of said casing having projecting members to support it on the vehicle frame, a plurality of trains of gears with axes in permanent fixed relation and a positive clutch entirely within said casing, and means projecting beyond said casing for varying the relations of said gears.

33. In a power transmission mechanism for motor vehicles, a parted casing, a driving shaft having a friction clutch connection exterior to said casing, a gear integral with or fixedly attached to said shaft interior to said casing, a frame supporting said casing, a bearing in the interior end of said shaft, a second shaft supported in said bearing and having another bearing in the opposite end of said casing, means upon said shaft for engaging the driving shaft, a countershaft, the axes of said shafts being in permanent fixed relation, gears upon said shafts operatively arranged, the parting in said casing being substantially in the plane of said shafts, whereby upon removal of a part of said casing the bearings and shafts may be lifted from the other part thereof, without removing it from said vehicle frame.

34. In a variable speed gear for motor cars, the combination of three shafts whose axes are fixed relatively to one another and two of said shafts having their axes axially alined, means for coupling the two axially alined shafts, a plurality of axially movable elements, each being adapted to effect two different power-transmitting connections, a plurality of axially fixed elements, and means for axially moving said movable elements for obtaining three different geared forward drives and a direct drive.

35. In a variable speed gear for motor cars, the combination of coöperating shafts, a plurality of fixed elements, two independently axially movable elements, means for combining said elements so that each of said movable elements effects two different power-transmitting connections and including a direct drive, means coöperating with certain of said elements for obtaining a reverse drive, and a single manipulating means for obtaining all of the various combinations.

36. In a four-speed change and reversing gear for motor cars, two shafts, means for positively connecting said shafts for obtaining one forward speed of the car, a third shaft, gear wheels arranged on certain of said shafts for obtaining three other speeds of the car, said gear wheels comprising a plurality of independently axially movable elements, each being adapted to effect power-transmitting connections, means comprising a reversing gear for connecting a pair of said gear wheels, and a single manipulating device for shifting the movable elements.

37. In a change speed gear for motor cars, the combination of coöperating shafts, a plurality of axially fixed elements, two independently axially movable elements, one of said movable elements comprising two gears, and the other of said movable elements comprising means for effecting two different power-transmitting connections, means for combining said axially fixed and movable elements, so as to obtain a plurality of geared forward speeds and a direct drive, and a single controlling device for obtaining said combinations.

38. In a motor car change gear, the combination of a driving and a driven shaft axially alined, means for coupling said shafts, a third shaft parallel to said alined shafts, gear wheels comprising a movable pair of spur gears on one of said shafts and another independently axially movable element, said element having means for effecting two different power-transmitting connections, means for shifting said spur gears and said movable element for obtaining two geared forward speeds of the car and a direct drive, and means coöperating with said gears for obtaining a reverse rotation.

39. In a motor car change speed mechanism, three coöperating shafts whose axes are fixed and two of which are axially alined, driving means comprising a plurality of axially independently movable elements for connecting said shafts for giving four forward speeds of the car, each of said elements being adapted to effect two different power-transmitting connections, and a single controlling device for obtaining the various combinations.

40. In a motor car change speed mechanism, three coöperating shafts whose axes are fixed and two of which are axially alined, a plurality of axially fixed elements including a clutch member, a plurality of axially independently movable elements, each of said movable elements being adapted to effect two different power-transmitting connections, one of said movable elements having a clutch member, means for combining said elements and clutch members to operate the car at four different forward speeds, one of said speeds being obtained by the direct connection of said alined shafts by said clutch members, and means for obtaining a reverse motion of the car coöperating therewith.

41. In a motor car variable speed mechanism, the combination of three shafts whose axes are fixed and two of which are axially alined, and means comprising a plurality of axially independently movable elements for obtaining four forward speeds and a reverse motion of the car, one of said four speeds being secured by a direct connection of said alined shafts, and each of said elements being adapted to effect two different power-transmitting connections.

42. In a motor car change speed mechanism, the combination of three coöperating shafts whose axes are fixed and two of which are axially alined, and mechanism comprising a plurality of independently axially movable elements for coöperating with said shafts to secure four forward speeds and one reverse speed of the car, each of said elements being adapted to effect two different power-transmitting connections.

43. In a motor car change speed mechanism, three coöperating shafts whose axes are fixed and two of which are axially alined, means comprising axially fixed spur gears and two independently axially movable elements for obtaining two forward geared drives and a direct drive, each of said elements being adapted to effect two different power-transmitting connections, gearing coöperating with certain of said spur gears for obtaining a reverse drive, and a single controlling device for obtaining the various combinations.

44. In a four speed gear, two shafts arranged end for end, a clutch for connecting and disconnecting said shafts, a countershaft, a gear wheel movable on said countershaft on one side of the clutch, independently movable gear wheels on one of the first named shafts located on the opposite side of said clutch, whereby one direct drive and three different geared drives can be obtained, and mechanism for effecting the several connections.

45. In a four speed change and reversing gear, two shafts, means for positively connecting said shafts for one forward speed, a countershaft, gear wheels arranged on said shafts movable relatively to each other for obtaining three other forward speeds, means comprising a movable reversing pinion for connecting one pair of gear wheels, and a single controlling device for shifting the movable elements.

46. In a motor vehicle change speed gear, the combination of two shafts, means for positively connecting said shafts for one forward speed, a countershaft, gear wheels arranged on certain of said shafts for obtaining three other forward speeds, there being movable elements on more than one of said shafts, a movable reversing spur gear for connecting one pair of said gear wheels, and a single controlling device for shifting the movable elements.

47. In a motor car four speed gearing, a driving shaft and a driven shaft arranged end to end, a clutch for connecting and disconnecting said shafts, a countershaft, gear wheels on certain of said shafts, whereby one direct drive and three different geared drives can be obtained, there being a plurality of axially movable elements, at least two of said elements being each adapted to effect two different power-transmitting connections, mechanism for effecting the several connections so that the gear on the driven shaft is driven by said gearing only when said clutch is open, and a single actuating device for operating said mechanism.

48. In a motor car change speed gear, the combination of spur gears, a clutch device, means for moving three elements thereof for obtaining three forward speeds of the driven shaft, each different from the speed of the driving shaft, the same speed of the driven shaft as that of the driving shaft, and a reversed speed, two of said elements being axially movable and each being adapted to effect two different power-transmitting connections.

49. In a motor car change speed gear, the combination of spur gears, a clutch device, means for moving at least three elements thereof for obtaining three forward speeds of the driven shaft each different from the speed of the driving shaft, the same speed of the driven shaft as that of the driving shaft, and a reversed speed, two of said elements each being adapted to effect two different power-transmitting connections, and a single controlling device for obtaining the various connections.

50. In a motor car change speed gear, the combination of coöperating shafts, two of which are axially alined, gear wheels and a clutch device comprising two independently axially movable elements, by the movement of which four different forward speeds are obtained, three of which speeds employ gear wheels and the fourth speed employing a direct drive between said alined shafts, each of said elements being adapted to effect two different power-transmitting connections, and means coöperating with the gears used for one forward drive to secure a reverse drive.

51. In a motor car change speed gear, the combination of coöperating shafts, two of which are axially alined, gear wheels and a clutch device comprising two independently axially movable elements by the movement of which four different forward speeds are obtained, three of which speeds employ gear wheels, and the fourth speed employs a direct drive between said alined shafts, each of said elements being adapted to effect two different power-transmitting connections, means coöperating with the gears used for one forward drive to secure a reverse drive, and a single controlling device for obtaining the various combinations.

52. In a motor car change speed gear, the combination of two axially alined shafts and a third shaft, power-transmitting means on said shafts comprising two axially movable elements and a third movable element, each of said movable elements comprising a gear wheel and by the movement of which three different forward speeds and one reverse speed are obtained, one of said forward speeds being a direct drive between said alined shafts, and means for positively moving each of said two elements in both directions and so that no power-transmitting means on said third shaft is engaged when the direct drive is secured.

53. In a motor car change gear, the combination of three shafts, two of said shafts being axially alined, one or more spur gears on certain of said shafts, there being two independently axially movable elements, each of said elements being adapted to effect two different power-transmitting connections, and a single controlling means for combining the gears and coupling the alined shafts for producing three geared forward speeds and a reverse drive.

54. In a motor car change gear, the combination of shafts and gears thereon for obtaining three forward geared speeds and a direct drive, the said shafts having fixed axes, there being two axially movable elements, means whereby said elements are moved manually in both directions, and means coöperating therewith for obtaining a reverse movement of the car.

55. In a motor car change gear, two axially alined shafts, a third shaft whose axis is fixed relatively to said two shafts, a plurality of axially fixed elements upon certain of said shafts, and a plurality of axially movable elements for obtaining a plurality of different geared forward speeds from the third shaft, and a direct drive between the axially alined shafts, at least two of said axially movable elements each being adapted to effect two different power-transmitting connections, means whereby said two elements are moved axially in both directions manually, and means coöperating therewith for obtaining a reverse movement of the car.

56. In a motor car change gear, two axially alined shafts, a third shaft whose axis is fixed relatively to said two shafts, a plurality of spur gear wheels axially fixed upon certain of said shafts, a plurality of axially movable elements each adapted to effect two different power-transmitting connections, means for engaging said axially movable elements with corresponding fixed elements, whereby three different geared forward speeds and a direct drive are obtained, and means coöperating with certain of said gears for obtaining a reverse drive.

57. In a motor car change gear, the combination of coöperating shafts, a plurality of fixed elements, two independently axially movable elements, each of said movable elements being adapted to effect two different power-transmitting connections, and means for combining said elements so as to obtain a plurality of geared speeds and a direct drive.

58. In a motor car change gear, the combination of coöperating shafts, a plurality of fixed elements, two independently axially movable elements, each of said movable elements being adapted to effect two different power-transmitting connections, means for uniting said elements so as to obtain a plurality of geared speeds and a direct drive, and a single controlling device for obtaining the various combinations.

59. In a motor car change gear, the combination of coöperating shafts, a plurality of fixed gears, two independently axially movable elements, each movable element comprising two transmitting members, and means for combining said gears and movable elements so as to obtain a plurality of geared speeds and a direct drive.

60. In a motor car change gear, the combination of coöperating shafts, a plurality of fixed gears, two independently axially movable elements, each movable element comprising two transmitting members, means for combining said gears and movable elements, so as to obtain a plurality of geared speeds and a direct drive, and a single controlling device for obtaining said combinations.

61. In a motor car change gear, the combination of coöperating shafts, a plurality of fixed gears, two independently axially movable elements, each movable element comprising two transmitting members, means for combining said gears and movable elements so as to obtain a plurality of geared speeds and a direct drive, and means in combination with certain of said gears for obtaining a reverse drive.

62. In a motor car change speed gear, the combination of coöperating shafts, a plurality of fixed gears, two independently axially movable elements, each movable element comprising two transmitting members, means for combining said gears and movable elements so as to obtain a plurality of geared speeds and a direct drive, means in combination with certain of said gears for obtaining a reverse drive, and a single controlling device for obtaining all of the various combinations.

63. In a motor car change gear, two shafts axially alined, a countershaft whose axis is fixed relatively to said alined shafts, gears on the alined shafts and on the countershaft, and means for coupling the two alined shafts so as to operate at the same speed, there being two axially movable elements, each of said elements being adapted to effect more than one power-transmitting connection, and means for operatively connecting the parts for obtaining a plurality of forward speeds.

64. In a motor car change gear, two shafts axially alined, a countershaft whose axis is fixed relatively to said alined shafts, gears on the alined shafts and on the countershaft, means for coupling the two alined shafts, so as to operate at the same speed, there being two axially movable elements, each of said elements being adapted to effect more than one power-transmitting connection, and a single operating device for operatively connecting the parts for obtaining a plurality of forward speeds.

65. In a motor car change gear, three shafts whose axes are fixed relatively to one another and two of which have their axes in alinement, a plurality of axially independently movable elements, one of said elements comprising a spur gear and a clutch device, and the other movable element comprising two gears, coöperating spur gears on certain of said shafts, means for operatively employing said movable elements for obtaining two forward geared speeds of the car and a direct drive between said alined shafts, means coöperating with certain of said gears for obtaining a reverse speed, and a single controlling device for obtaining said various combinations.

66. In a motor car change gear, the combination of two axially alined shafts, means for coupling said shafts to rotate at the same speed, a third shaft whose axis is fixed relatively thereto, spur gears on said third shaft, two independently movable elements, each of said elements comprising two transmitting members, and means for operatively connecting each of said elements so that one of said spur gear wheels on one element is out of mesh when the other spur gear wheel on the same element is in mesh.

67. In a motor car change gear, the combination of two axially alined shafts, means for coupling them to rotate at the same speed, a third shaft whose axis is fixed relatively thereto, four spur gears on said third shaft, a plurality of spur gears on said axially alined shafts, means for axially and independently moving at least two of said spur gears for obtaining three forward geared speeds, means comprising a spur gear coöperating therewith for obtaining a reverse speed, and a single controlling device for obtaining the various combinations.

68. In combination in a change speed mechanism, a driving shaft and gear, a driven shaft in axial alinement, a plurality of gears on said driven shaft of relative sizes increasing in the order of their position from the driving shaft, a single countershaft, gears fixed on said countershaft respectively complementary to the gears on the driving and driven shafts, means whereby any one of said train of gears on the driven shaft may be moved into and out of engagement with its complementary gear on the countershaft.

69. In combination in a change speed mechanism for motor vehicles, vehicle frame, a casing and arms or lugs on said casing adapted to detachably secure it to said frame, a driving shaft deriving power from the engine and projecting into said casing, a shaft projecting from said casing at an angle to said driving shaft, an intermediate driven shaft in alinement with said driving shaft and direct connections to drive the shaft extending from said casing, means to directly couple the driving shaft and driven shaft within said casing, a plurality of sliding gears within said casing to vary the speed of the driven shaft, gears cooperating with said sliding gears, and gears within said casing to reverse the direction of rotation of said driven shaft.

70. In combination in a change speed mechanism for automobiles, a driving shaft deriving power from an engine and a clutch adapted to connect and disconnect it with said engine, a driven shaft, a countershaft and a casing inclosing part of the driving and the counter and driven shafts, two independently sliding elements on the driven shaft, each embodying one or more gears, a clutch to directly connect the driving and driven shafts, two longitudinally reciprocating rods having connections with the longitudinally sliding elements on the driven shaft, operating means adapted to move said rods longitudinally, and means for selecting and operating but one of said rods at a time.

This specification signed and witnessed this 27th day of January, A. D. 1902.

FRED A. LAW.

In the presence of—
HENRY L. SMITH,
ARTHUR N. MANROSS.